(12) United States Patent  
Wada

(10) Patent No.: US 7,315,196 B2  
(45) Date of Patent: Jan. 1, 2008

(54) VOLTAGE GENERATING CIRCUIT THAT PRODUCES INTERNAL SUPPLY VOLTAGE FROM EXTERNAL SUPPLY VOLTAGE

(75) Inventor: Masaharu Wada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 99 days.

(21) Appl. No.: 11/004,864

(22) Filed: Dec. 7, 2004

(65) Prior Publication Data

US 2006/0038607 A1 Feb. 23, 2006

(30) Foreign Application Priority Data

Aug. 19, 2004 (JP) ............... 2004-239813

(51) Int. Cl.
  *G05F 1/10* (2006.01)
  *H03K 3/01* (2006.01)
(52) U.S. Cl. ...................... 327/536; 327/534
(58) Field of Classification Search ............... 327/534, 327/535, 536, 537; 363/60, 59
See application file for complete search history.

(56) References Cited

U.S. PATENT DOCUMENTS

| | | | | | |
|---|---|---|---|---|---|
| 3,457,435 | A | * | 7/1969 | Gibson et al. | 327/437 |
| 4,417,158 | A | * | 11/1983 | Ito et al. | 327/295 |
| 5,392,205 | A | * | 2/1995 | Zavaleta | 363/59 |
| 5,905,402 | A | * | 5/1999 | Kim et al. | 327/536 |
| 5,933,047 | A | * | 8/1999 | Zhu et al. | 327/534 |
| 5,999,009 | A | * | 12/1999 | Mitsui | 324/765 |
| 6,087,891 | A | * | 7/2000 | Yoon et al. | 327/530 |
| 6,172,886 | B1 | * | 1/2001 | Lauterbach et al. | 363/60 |
| 6,204,721 | B1 | * | 3/2001 | Yuen et al. | 327/534 |
| 6,242,971 | B1 | * | 6/2001 | Manstretta et al. | 327/537 |
| 6,501,326 | B2 | * | 12/2002 | Fujii et al. | 327/536 |
| 6,552,576 | B1 | * | 4/2003 | Bobba et al. | 326/113 |
| 6,690,227 | B2 | * | 2/2004 | Lee et al. | 327/536 |
| 6,856,525 | B2 | * | 2/2005 | Wallis | 363/59 |
| 2002/0125934 | A1 | * | 9/2002 | Wu et al. | 327/534 |
| 2003/0197548 | A1 | * | 10/2003 | Toyoda et al. | 327/536 |
| 2004/0213024 | A1 | | 10/2004 | Wada | |

FOREIGN PATENT DOCUMENTS

JP 7-212215 8/1995

\* cited by examiner

*Primary Examiner*—Kenneth B. Wells
*Assistant Examiner*—Thomas J. Hiltunen
(74) *Attorney, Agent, or Firm*—Oblon, Spivak, McClelland, Maier & Neustadt, P.C.

(57) ABSTRACT

A pump circuit includes first and second transistors connected between an input terminal and an output terminal, and a capacitor which is connected at its one end to the connection node of the first and second transistors. The pump circuit is responsive to control signals applied to the gate electrodes of the first and second transistors and another end of the capacitor to output from the output terminal a second voltage which is approximately equal to a first voltage applied to the input terminal. A back-gate voltage generating circuit which produces a third voltage which is less than the lower one of the first and second voltages. The third voltage is applied to at least the back gate of the second transistor which outputs the second voltage.

20 Claims, 6 Drawing Sheets

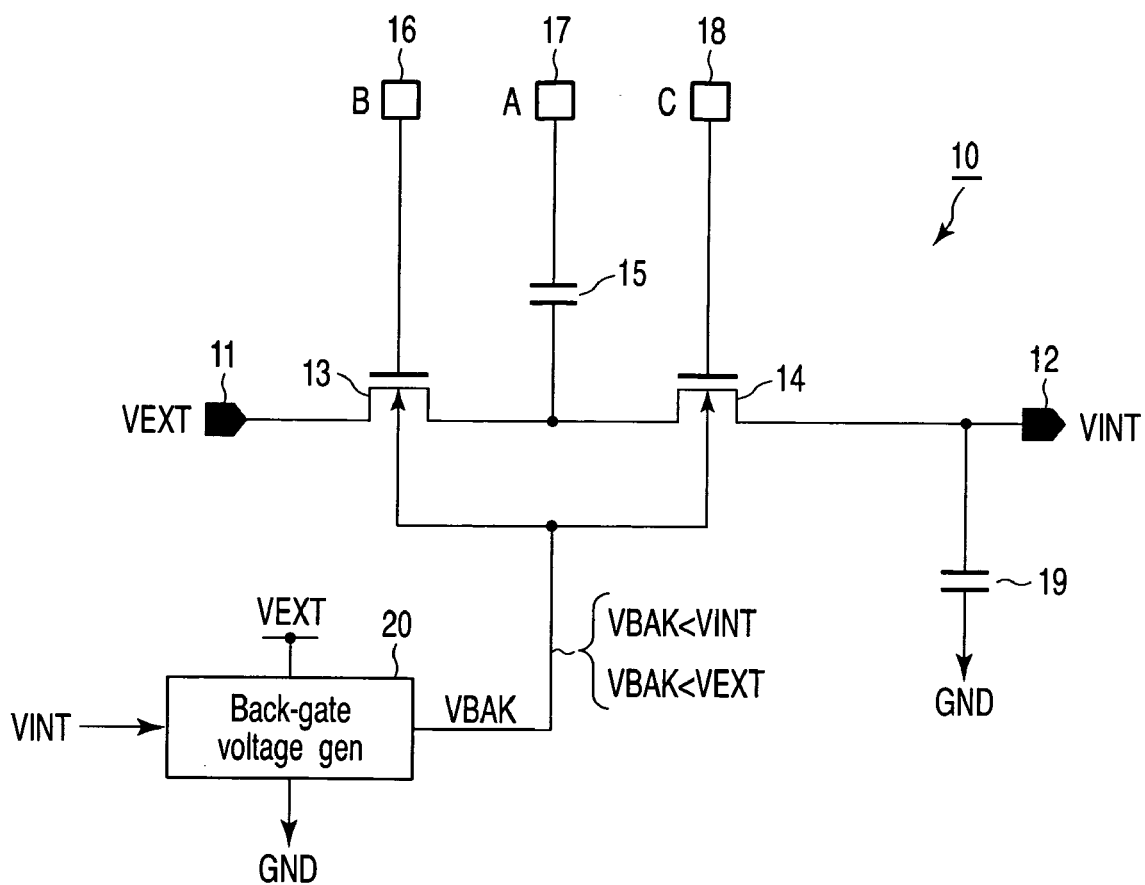
F I G. 1

VOLTAGE GENERATING CIRCUIT THAT PRODUCES INTERNAL SUPPLY VOLTAGE FROM EXTERNAL SUPPLY VOLTAGE

CROSS-REFERENCE TO RELATED APPLICATIONS

This application is based upon and claims the benefit of priority from prior Japanese Patent Application No. 2004-239813, filed Aug. 19, 2004, the entire contents of which are incorporated herein by reference.

BACKGROUND OF THE INVENTION

1. Field of the Invention

The present invention relates to a voltage generating circuit which is adapted for use in a semiconductor device having an on-chip power supply circuit and produces an internal supply voltage from an external supply voltage.

2. Description of the Related Art

In recent years, with advances in semiconductor manufacturing technology, the operating voltage of transistors has become increasingly low. Accordingly, it has become necessary to suppress variations in supply voltage within the chip. Up to now, a method has been adopted which involves connecting a capacitor having a large capacitance to an interconnect line which connects a power supply pad supplied with an external supply voltage with macro cells in order to suppress variations in supply voltage within the chip. However, the interconnect line between the power supply pad and the macro cells has an impedance, which may result in failure to suppress variations in supply voltage sufficiently.

For this reason, in recent years, a method has been adopted in which a voltage generating circuit, such as a DC-to-DC converter, is provided on a chip to produce an internal supply voltage from an external supply voltage. As the voltage generating circuit, use has been made of a dropper type regulator circuit or a switched-capacitor-based voltage dropping (stepdown) circuit in producing a voltage lower than an external supply voltage or a pump circuit or the like in producing a voltage higher than the external supply voltage. When a necessary internal supply voltage is comparable to an external supply voltage, both a stepdown circuit and a stepup circuit are provided on a chip. When the external supply voltage is higher than the internal voltage, the stepdown circuit is used to make the internal voltage lower the external supply voltage; otherwise, the stepup circuit is used to step up the external supply voltage. However, the provision of both the stepup circuit and the stepdown circuit results in an increase in the chip area.

Accordingly, a switched-capacitor type of voltage generating circuit has been developed which has a stepdown circuit and a stepup circuit. This voltage generating circuit is composed of two or more charge-transfer N-channel MOS transistors (hereinafter referred to as NMOS transistors) series connected between an input terminal supplied with an external supply voltage and an output terminal, capacitors each of which is connected between the node between the adjacent NMOS transistors and ground, and a capacitor connected between the output terminal and the series combination of the NMOS transistors. The voltage generating circuit produces a desired internal supply voltage by turning on and off the NMOS transistors in sequence starting with the transistor on the input side and thereby charging the capacitors in sequence.

The back gate of each NMOS transistor in the circuit is connected to ground (GND). In such a situation, the on resistance of the MOS transistor increases. For this reason, the current supply capability of the transistor falls. In order to reduce the on resistance of the transistor, one might suggest setting the back-gate bias a little higher.

In a voltage generating circuit arranged, for example, to produce an internal supply voltage (VINT) of 3.3 V from an external supply voltage (VEXT) of 3.3 V, when the tolerance for variations in the external supply voltage is 10%, it may fluctuate between 2.97 and 3.63 V. It is therefore required for the voltage generating circuit to perform both the stepdown and the stepup operation as the external supply voltage fluctuates. To this end, various methods are considered. For example, when the back-gate bias of an NMOS transistor is increased to lower its on resistance, a forward voltage is applied across its PN junction, which may cause its associated parasitic bipolar transistor to turn on and consequently a leakage current to flow. When the back-gate bias of an NMOS transistor is too low, its on resistance increases, resulting in reduced current supply capability. Thus, when the back-gate bias is made either high or low, the performance is degraded. Therefore, the demand is increasing for a voltage generating circuit which is capable of preventing the circuit performance from falling whether the internal supply voltage is higher or lower than the internal supply voltage.

A voltage generating circuit using switched capacitors is described in, for example, Jpn. Pat. Appln. KOKAI Publication No. 07-212215. In addition, a back-gate bias producing circuit is described in, for example, U.S. Pat. No. 5,900,665, which is adapted to produce a back-gate bias according to an operating cycle of a semiconductor integrated circuit.

BRIEF SUMMARY OF THE INVENTION

According to a first aspect of the invention, there is provided a voltage generating circuit comprising: a pump circuit including: first and second transistors connected between an input terminal and an output terminal; and a capacitor which is connected at its one end to the connection node of the first and second transistors, the pump circuit being responsive to control signals applied to the gate electrodes of the first and second transistors and another end of the capacitor to output from the output terminal a second voltage which is approximately equal to a first voltage applied to the input terminal; and a back-gate voltage generating circuit which produces a third voltage which is less than the lower one of the first and second voltages, the third voltage being applied to at least the back gate of the second transistor which outputs the second voltage.

According to a second aspect of the invention, there is provided a voltage generating circuit comprising: a pump circuit including: first and second transistors connected between an input terminal and an output terminal; and a first capacitor which is connected at its one end to the connection node of the first and second transistors, the pump circuit being responsive to control signals applied to the gate electrodes of the first and second transistors and another end of the first capacitor to output from the output terminal a second voltage which is approximately equal to a first voltage applied to the input terminal; a back-gate voltage generating circuit which produces a third voltage which is lower than the less one of the first and second voltages, the third voltage being applied to at least the back gate of the second transistor; a second capacitor having its one end connected to the gate electrode of the first transistor and its other end connected to receive a corresponding one of the control signals; a first diode having its cathode connected to the connection node of the gate electrode of the first transistor and the second capacitor and its anode connected to receive the third voltage; a third capacitor having its one end connected to the gate electrode of the second transistor and its other end connected to receive a corresponding one of the control signals; and a second diode having its cathode connected to the connection node of the gate electrode of the second transistor and the third capacitor and its anode connected to receive the third voltage.

BRIEF DESCRIPTION OF THE SEVERAL VIEWS OF THE DRAWING

FIG. 1 is a schematic circuit diagram of a voltage generating circuit according to a first embodiment of the present invention;

DETAILED DESCRIPTION OF THE INVENTION

Figure 2:
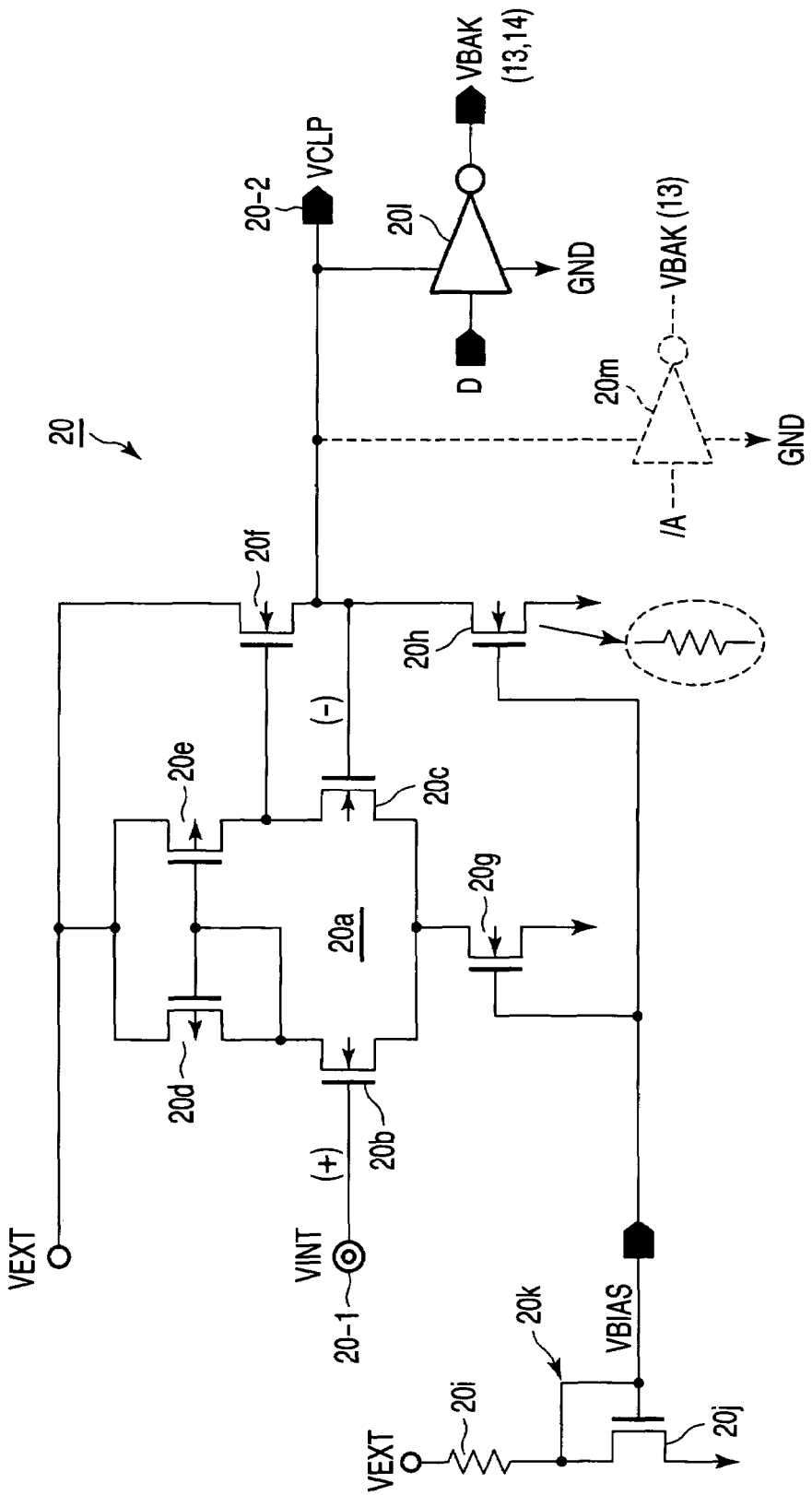
FIG. 2 is a circuit diagram of the back-gate voltage generating circuit shown in FIG. 1.

The preferred embodiments of the present invention will be described hereinafter with reference to the accompanying drawings.

FIG. 1 shows the arrangement of a voltage generating circuit, indicated generally at 10, according to a first embodiment of the present invention. This voltage generating circuit 10 has a switched-capacitor type of pump circuit by way of example. In FIG. 1, NMOS transistors 13 and 14 adapted to transfer charges are connected in series between an input terminal 11 supplied with an external supply voltage VEXT and an output terminal 12 from which an internal supply voltage VINT is output. The connection node of the transistors 13 and 14 is connected to one end of a capacitor 15. Control signal input terminals 16, 17 and 18 are connected to the gate electrode of the NMOS transistor 13, the other end of the pump capacitor 15, and the gate electrode of the NMOS transistor 14, respectively. The control signal input terminals 16, 17 and 18 are supplied with control signals A, B and C, respectively. A charge storage capacitor 19 is connected between the connection node of the NMOS transistor 14 and the output terminal 12 and ground. A back-gate voltage generating circuit 20 produces a bias voltage VBAK which is lower than the external supply voltage VEXT and the internal supply voltage VINT. The bias voltage VBAK produced by the back-gate voltage generating circuit 20 is applied to the back gates of the NMOS transistors 13 and 14.

FIG. 2 shows an exemplary arrangement of the back-gate voltage generating circuit 20. The back-gate voltage generating circuit 20 is composed of a differential amplifier 20a, an NMOS transistor 20f as an output transistor, an NMOS transistor 20g as a constant current source, an NMOS transistor 20h as a load, a bias circuit 20k, and an inverter circuit 201.

The differential amplifier 20a is constructed from NMOS transistors 20b and 20c and PMOS transistors 20d and 20e. The gate electrode of the NMOS transistor 20b forms an input terminal 20-1 of the differential amplifier 20a, while the gate electrode of the NMOS transistor 20c forms the other input terminal of the differential amplifier 20a. The input terminal 20-1 is supplied with the internal supply voltage VINT output from the voltage generating circuit 10 shown in FIG. 1. The other input terminal of the differential amplifier 20a is connected to an output terminal 20-2 which outputs a voltage VCLP which will be described later.

The NMOS transistors 20b and 20c have their sources connected together to ground through the NMOS transistor 20g acting as a constant-current source and their drains connected together to a node supplied with the external supply voltage VEXT through PMOS transistors 20d and 20e, respectively. The gates of the PMOS transistors 20d and 20e are connected together to the drain of the NMOS transistor 20b.

The connection node of the PMOS transistor 20e and the NMOS transistor 20c is connected to the gate electrode of the NMOS transistor 20f connected in source follower configuration. The NMOS transistor 20f has its drain connected to the node supplied with the external supply voltage VEXT and its source connected to the output terminal 20-2. Between the output terminal 20-2 and ground is connected the NMOS transistor 20h acting as a load transistor. The gate electrodes of the NMOS transistors 20h and 20g are supplied with the bias voltage VBIAS output from the bias circuit 20k.

The bias circuit 20k is composed of a resistor 20i and an NMOS transistor 20j which are connected in series between the node supplied with the external supply voltage VEXT and ground. The NMOS transistor 20j has its gate and drain connected together to output the bias voltage VBIAS.

Between the output terminal 20-2 and ground is connected the inverter circuit 201 acting as an output circuit. The inverter circuit 201 has its input terminal supplied with a control signal D and outputs at its output terminal a back-gate voltage VBAK. The high level of the back-gate voltage VBAK corresponds to a voltage VLCP and the low level corresponds to the ground level GND.

Figure 3:
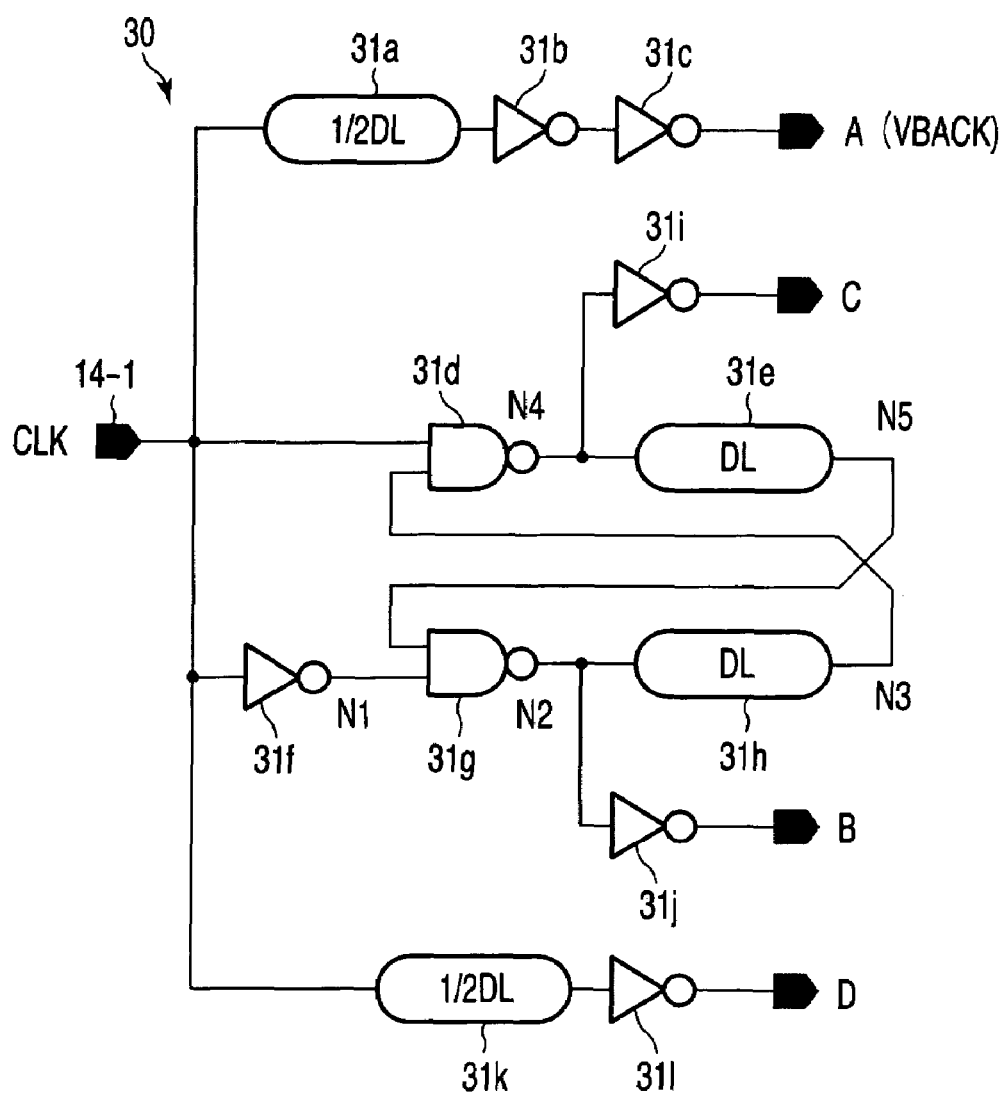
FIG. 3 is a circuit diagram of a circuit that produces control signals shown in FIGS. 1 and 2.

FIG. 3 shows an exemplary arrangement of the control signal generating circuit 30 that produces the control signals A, B, C, and D shown in FIGS. 1 and 2. The control signal generating circuit 30 is driven by a clock signal CLK, which makes transitions from, for example, external supply voltage VEXT to ground potential GND and vice versa. The control signals A, B, C and D likewise make transitions from external supply voltage VEXT to ground potential GND and vice versa.

The control signal A is produced by a series combination of a delay circuit 31a and inverter circuits 31b and 31c. That is, the clock signal CLK is applied to the delay circuit 31a and the control signal A is output from the inverter circuit 31c. The delay circuit 31a has a delay time half that of delay circuits 31e and 31h which will be described later.

The control signals B, C and D are produced by a flip-flop circuit containing delay circuits and a plurality of inverter circuits. The flip-flop circuit is composed of NAND circuits 31d and 31g, an inverter circuit 31f, and delay circuits 31e and 31h. The clock signal CLK is applied to an input terminal of the NAND circuit 31d and to an input terminal of the NAND circuit 31g through an inverter circuit 31f. The output terminal of the NAND circuit 31d is connected through the delay circuit 31e to the other input terminal of the NAND circuit 31g. The output terminal of the NAND circuit 31g is connected through the delay circuit 31h to the other input terminal of the NAND circuit 31d. To the connection node of the NAND circuit 31d and the delay circuit 31e is connected the input terminal of an inverter 31i from which the signal C is output. To the connection node of the NAND circuit 31g and the delay circuit 31h is connected the input terminal of an inverter 31j which outputs the signal B.

The control signal D is produced by a series combination of a delay circuit 31k and an inverter circuit 31l. That is, the control signal D is produced by first applying the clock signal CLK to the delay circuit 31k and then inverting the output signal of the delay circuit by the inverter circuit 31l. The delay circuit 31k has a delay time half that of the delay circuits 31e and 31h.

The clock signal CLK has its period controlled according the magnitude of the internal supply voltage VINT. That is, the frequency of the clock signal CLK is varied by first making a comparison between the internal supply voltage VINT and a reference voltage not shown by means of a comparator and then controlling the frequency of an oscillator not shown according to the comparative result. Thus, the magnitude of the internal supply voltage VINT is kept constant.

Figure 4:
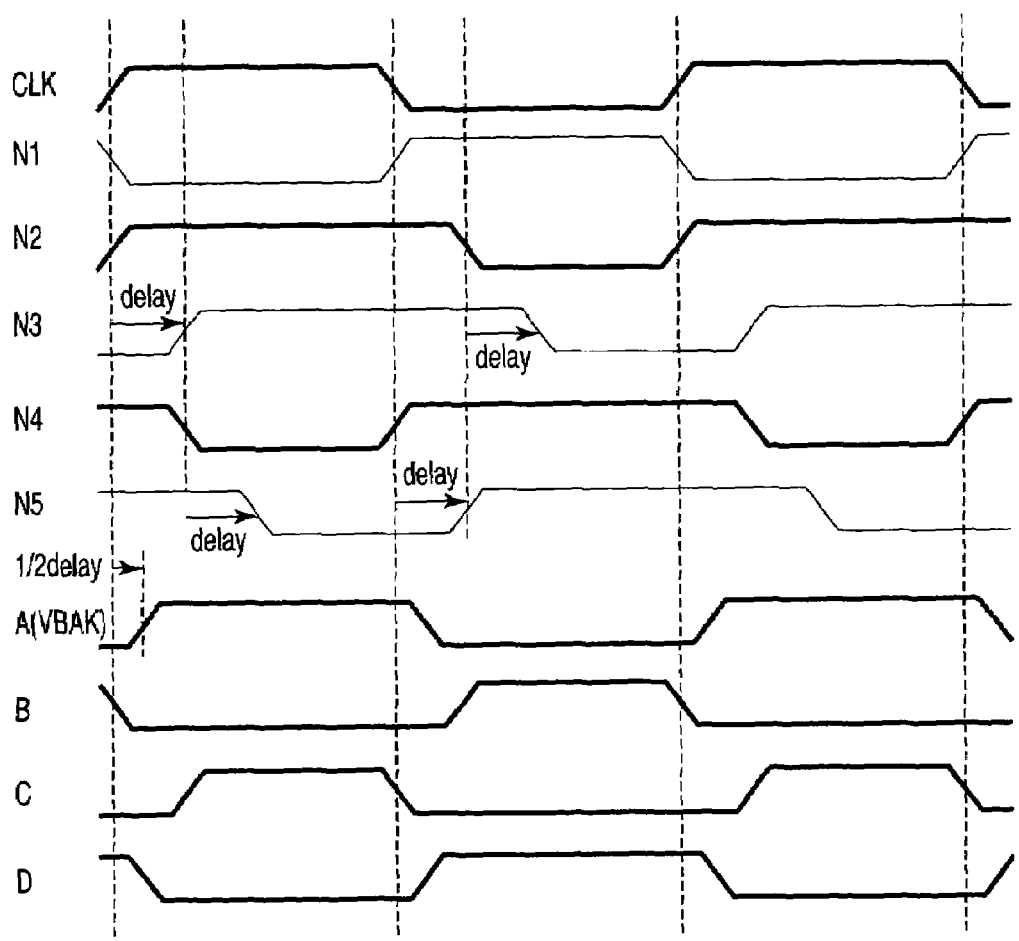
FIG. 4 is a timing diagram for use in explanation of the operation of the circuits shown in FIGS. 1 and 2.

FIG. 4 illustrates the operation of the circuit arrangement of FIG. 3 and a relationship among the control signals A, B, C and D. Reference is now made to FIG. 4 to describe the operation of the circuit arrangements of FIGS. 1 and 2.

The NMOS transistors 13 and 14 and the capacitor 15 shown in FIG. 1 are driven by the control signals B, C, and A, respectively. First, the NMOS transistor 13 is turned on by the control signal B and consequently the capacitor 15 is charged by VEXT. After that, the control signals A and C cause charges on the capacitor 15 to be transferred through the NMOS transistor 14 to the output terminal 12 as the internal supply voltage VINT.

During the operation, the differential amplifier 20a in the back-gate voltage generating circuit 20 makes a comparison between the voltage VCLP output from the source of the NMOS transistor 20f and the internal supply voltage VINT and then controls the voltage at the gate of the NMOS transistor 20f according to the difference between VCLP and VINT. For example, when the external supply voltage VEXT drops below a standard voltage (for example, 3.3 V) and consequently the internal supply voltage VINT goes lower than VCLP, the voltage at the gate of the NMOS transistor 20f drops, causing the voltage VCLP to drop. For this reason, the voltage VLCP becomes less than both the external supply voltage VEXT and the internal supply voltage VINT. For example, when the external supply voltage VEXT is 2.5 V and the internal supply voltage VINT is 1.8 V, the back-gate voltage VBAK becomes less than 1.8 V.

When the external supply voltage VEXT goes higher than the standard voltage and consequently the internal supply voltage VINT goes higher than the voltage VLCP, on the other hand, the gate voltage of the NMOS transistor 20f goes higher, raising the voltage VCLP. However, the voltage VLCP becomes less than both the external supply voltage VEXT and the internal supply voltage VINT. For example, when the external supply voltage VEXT is 3.6 V and the internal supply voltage VINT is 3.0 V, the voltage VCLP becomes less than 3.0 V.

Thus, the voltage VLCP is set to a voltage which is not higher than the lower one of the external supply voltage VEXT and the internal supply voltage VINT.

The inverter circuit 201 in the back-gate voltage generating circuit 20 is operated by the control signal D. For this reason, when the NMOS transistors 13 and 14 shown in FIG. 1 turn off and on, respectively, their back-gates are supplied with the back-gate voltage VBAK output from the inverter circuit 201. The back-gate voltage VBAK makes transitions from voltage VLCP to ground potential GND and vice versa. Thus, the back-gates of the charge transfer NMOS transistors 13 and 14 will not go higher in potential than the lower one of the external supply voltage VEXT and the internal supply voltage VINT. In the NMOS transistors 13 and 14, therefore, a forward bias can be prevented from being applied between the source and the back gate and between the drain and the back gate. Moreover, when the NMOS transistor 14 transfers charges, the back gate voltage VBAK is applied to its back-gate, allowing its on resistance to be reduced. For this reason, the current supply capability of the NMOS transistor 14 can be prevented from falling.

According to the first embodiment, the switched capacitor type of pump circuit 10 using the NMOS transistors 13 and 14 as switches produces the internal supply voltage VINT from the external supply voltage VEXT. The back-gate voltage generating circuit 20 makes a comparison between the internal supply voltage VINT and the external supply voltage VEXT and then produces the back-gate voltage VBAK lower than the lower one of VINT and VEXT to control the back gates of the NMOS transistors 13 and 14. When the internal supply voltage VINT output from the pump circuit is higher than the external supply voltage VEXT or vice versa, therefore, the PN junctions of the NMOS transistors 13 and 14 forming the pump circuit can be prevented from becoming forward-biased. Accordingly, parasitic bipolar transistors can be prevented from turning on and leakage currents can be prevented from frowning.

When the NMOS transistor 14 turns on, its back gate is supplied with the back-gate voltage at a suitable level, allowing its on resistance to be kept small. Therefore, the current supply capability can be prevented from falling.

The voltage VCLP is taken at the source of the NMOS transistor 20f arranged in source follower configuration. Thus, the current capacity of the voltage VLCP can be increased.

Although, in the first embodiment, the back-gate voltage generating circuit 20 has the inverter circuit 201 enabled to operate by the control signal D, it is also possible to omit the inverter circuit 201 and apply the voltage VCLP to the back gates of the NMOS transistors 13 and 14 as the back-gate voltage VBAK. Even such a configuration will provide the same advantages as the first embodiment.

It is better to perform the back-gate control on the transistor nearer to the output terminal. In the case of the circuit shown in FIG. 1, therefore, the back gate of the NMOS transistor 14 is controlled primarily. However, as shown dashed in FIG. 2, two inverter circuits may be connected to the output terminal 20-2 to control the back gate of each of the MOS transistors 13 and 14 separately.

That is, an inverter circuit 20m is connected between the output terminal 20-2 and ground separately from the inverter circuit 201 and the control signal /A is applied to the input terminal of the inverter circuit 20m. The back-gate voltage VBAK output from the inverter circuit 20m is applied to the back gate of the NMOS transistor 13 with the back-gate voltage VBAK output from the inverter circuit 201 applied to the back gate of the NMOS transistor 14.

According to such a configuration, when the NMOS transistors 13 and 14 are turned on, each of them is supplied at its back gate with a suitable back-gate voltage. It therefore becomes possible to control the back gate of each of the NMOS transistors 13 and 14 separately.

The NMOS transistor 20h as a load shown in FIG. 1 can be replaced with a resistor as shown dashed.

Figure 5:
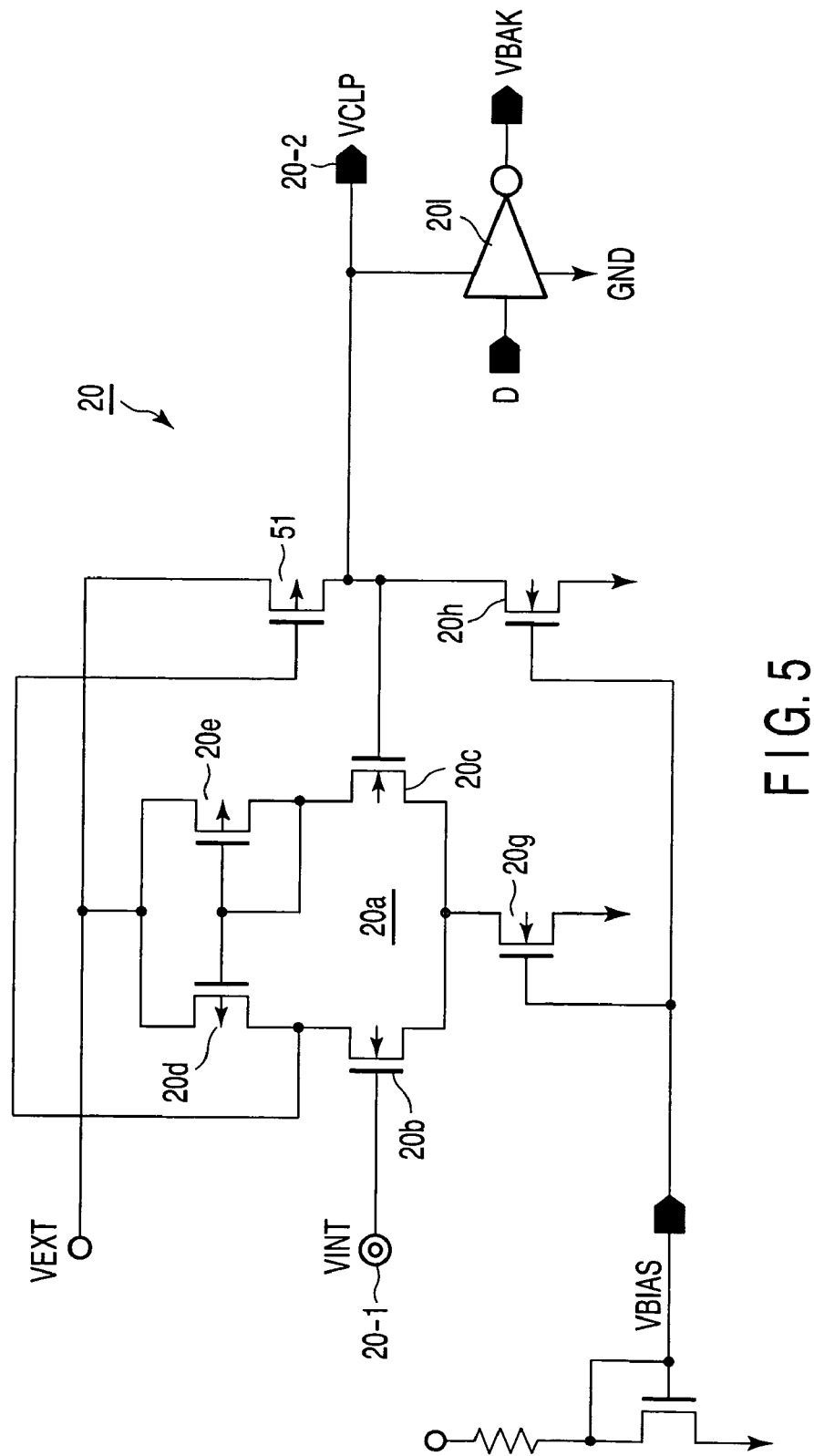
FIG. 5 shows a first modification of the back-gate voltage generating circuit shown in FIG. 2.

FIG. 5 shows a first modification of the back-gate voltage generating circuit 20. In this diagram, parts corresponding to those in FIG. 2 are denoted by like reference numerals. In FIG. 2, the voltage VCLP is taken at the source of the NMOS transistor 20f. In contrast, in FIG. 5, the voltage VCLP is taken at the source of a PMOS transistor 51, which has its source connected to the external supply voltage VEXT, its drain connected to the output terminal 20-2, and its gate electrode connected to the connection node of the PMOS transistor 20d and the NMOS transistor 20b.

According to the first modification, the voltage VCLP is output from the drain of the PMOS transistor 51. The first modification can also produce the voltage VCLP (back-gate voltage VBAK) which is less than the lower one of the external supply voltage VEXT and the internal supply voltage VINT.

In the case of FIG. 2 where the NMOS transistor 20f is used, the voltage VCLP becomes less than the drain voltage of the NMOS transistor 20f by its threshold voltage. The use of the PMOS transistor 51 can prevent such a voltage drop.

Figure 6:
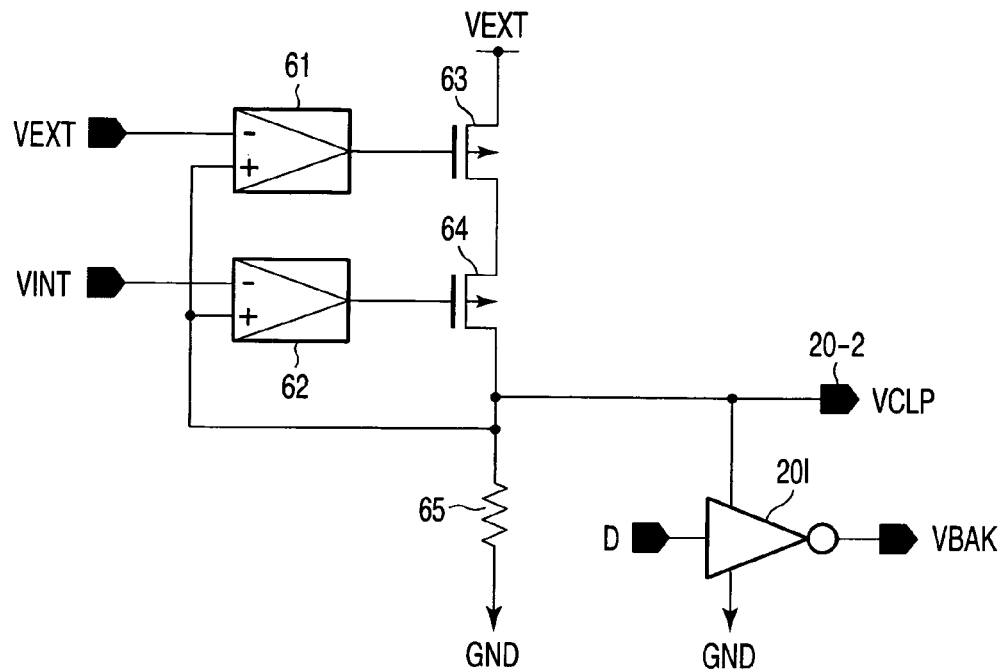
FIG. 6 shows a second modification of the back-gate voltage generating circuit shown in FIG. 2.

FIG. 6 shows a second modification of the back-gate voltage generating circuit 20. The back-gate voltage generating circuits 20 shown in FIGS. 2 and 5 use a single differential amplifier. In contrast, the back-gate voltage generating circuit shown in FIG. 6 uses two differential amplifiers. In FIG. 6, a differential amplifier 61 has its inverting input terminal connected to receive the external supply voltage VEXT and its noninverting input terminal connected to receive the voltage VCLP. A differential amplifier 62 has its inverting input terminal connected to receive the internal supply voltage VINT and its noninverting input terminal connected to receive the voltage VCLP. These differential amplifiers 61 and 62 may be configured in the same way as the differential amplifier 20a shown in FIG. 2. Between the node supplied with the external supply voltage VEXT and ground are connected in series PMOS transistors 63 and 64 and a resistor 65. The gate electrodes of the PMOS transistors 63 and 64 are connected the output terminals of the differential amplifiers 61 and 62, respectively. The connection node of the PMOS transistor 64 and the resistor 65 is connected to the output terminal 20-2 from which the voltage VCLP is output. Between the output terminal 20-2 and ground is connected an inverter circuit 201, which has its input terminal connected to receive the control signal D and outputs the back-gate voltage VBAK at its output terminal.

In the circuit thus configured, the differential amplifiers 61 and 62 compare the voltage VCLP with the external supply voltage VEXT and the internal supply voltage VINT, respectively, and the PMOS transistors 63 and 64 are controlled accordingly. As the result, the voltage VCLP becomes less than the lower one of the external supply voltage VEXT and the internal supply voltage VINT.

The second modification will also provide the same advantages as the circuit arrangements shown in FIGS. 2 and 5.

SECOND EMBODIMENT

Figure 7:
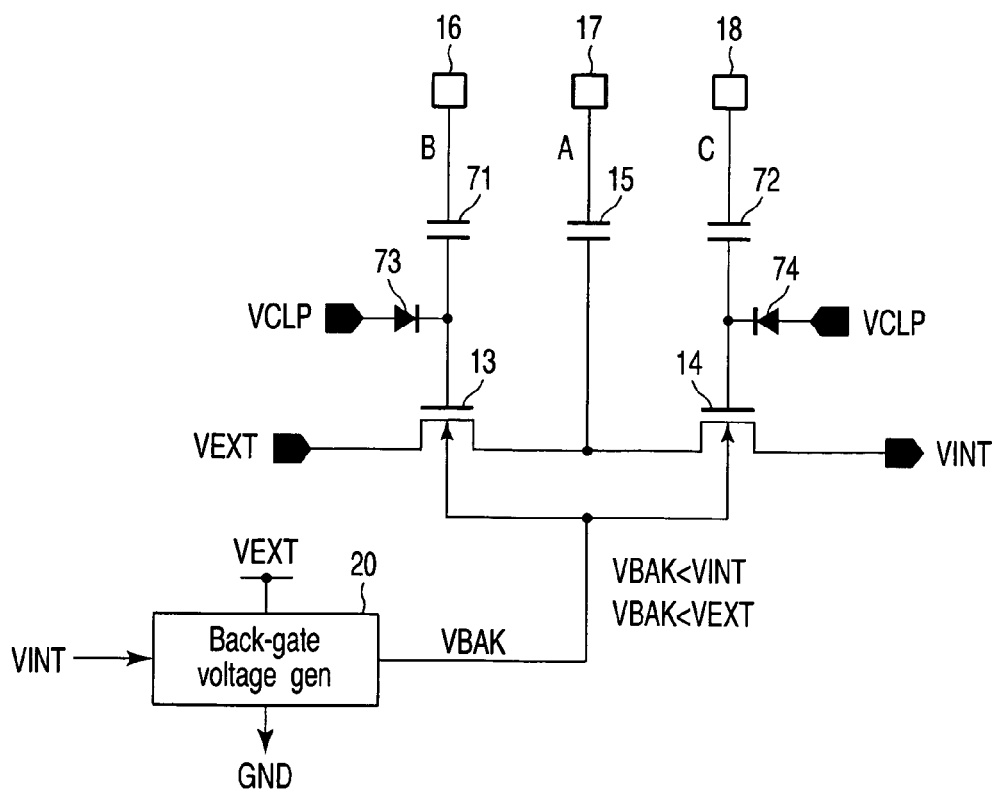
FIG. 7 is a schematic circuit diagram of a voltage generating circuit according to a second embodiment of the present invention.

FIG. 7 shows a second embodiment of the present invention. In this diagram, corresponding parts to those in FIG. 1 are denoted by like reference numerals and only different parts will be described. A capacitor 71 is connected between the gate electrode of the NMOS transistor 13 and the control signal input terminal 16. To the connection node of the gate electrode of the NMOS transistor 13 and the capacitor 71 is connected the cathode of a diode 73, which has its anode connected to receive the voltage VCLP. A capacitor 72 is connected between the gate electrode of the NMOS transistor 14 and the control signal input terminal 18. To the connection node of the gate electrode of the NMOS transistor 14 and the capacitor 72 is connected the cathode of a diode 74, which has its anode connected to receive the voltage VCLP. The back-gate voltage generating circuit 20 may be configured identically to that shown in FIG. 2.

In the circuit thus configured, the control signal input terminals 16, 17 and 18 are supplied with the control signals B, A, and C, respectively, and the gate electrodes of the NMOS transistors 13 and 14 are connected to receive the voltage VCLP through the diodes 73 and 74, respectively. For this reason, the potential at the gate electrode of each of the NMOS transistors 13 and 14 is raised to the sum of the external supply voltage VEXT and the voltage VCLP. The resistance of each of the NMOS transistors 13 and 14 can therefore be further reduced.

According to the second embodiment, the NMOS transistors 13 and 14 have their back gates controlled by the back-gate voltage produced by the back-gate voltage generating circuit 20 and their gate electrodes supplied with the voltage VCLP from the back-gate voltage generating circuit through the diodes 73 and 74. For this reason, leakage current can be prevented and the on resistance can be further reduced.

It is also possible to apply the first and second modifications to the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A voltage generating circuit comprising:
   a pump circuit including:
   first and second transistors connected between an input terminal and an output terminal, the input terminal being applied with a first voltage; and
   a capacitor which is connected at its one end to a connection node of the first and second transistors,
   the pump circuit being responsive to control signals applied to the gate electrodes of the first and second transistors and another end of the capacitor to output from the output terminal a second voltage; and
   a back-gate voltage generating circuit which produces a third voltage based on a comparing result between the third voltage and the second voltage, the third voltage being less than the lower one of the first and second voltages, and being applied to at least the back gate of the second transistor which outputs the second voltage.

2. The circuit according to claim 1, wherein the back-gate voltage generating circuit comprises:

a differential amplifier which makes a comparison between the third voltage and the second voltage; and a third transistor having its gate electrode connected to the output terminal of the differential amplifier and its current path connected at one end to receive the first voltage and at another end to output the third voltage.

3. The circuit according to claim 2, further comprising a first output circuit which is supplied with the third voltage as its supply voltage and outputs the third voltage at the time the second transistor is turned on.

4. The circuit according to claim 3, further comprising a second output circuit which is supplied with the third voltage as its supply voltage, outputs the third voltage at the time the second transistor is turned on and applies the third voltage to the back gate of the first transistor.

5. The circuit according to claim 3, wherein the first output circuit is a first inverter circuit which is supplied with the third voltage as its supply voltage and has its input terminal connected to receive a signal and its output terminal connected to the back gate of the first transistor.

6. The circuit according to claim 4, wherein the second output circuit is a second inverter circuit which is supplied with the third voltage as its supply voltage and has its input terminal connected to receive a signal and its output terminal connected to the back gate of the second transistor.

7. The circuit according to claim 2, wherein the third transistor is an N-channel MOS transistor.

8. The circuit according to claim 2, wherein the third transistor is a P-channel MOS transistor.

9. The circuit according to claim 1, wherein the back-gate voltage generating circuit comprises:

a first differential amplifier which outputs the difference between the first voltage and the third voltage;

a second differential amplifier which outputs the difference between the second voltage and the third voltage;

a fourth transistor having its current path connected at one end to receive the first voltage and its gate electrode connected to the output terminal of the first differential amplifier;

a fifth transistor having its current path connected at one end to the other end of the current path of the fourth transistor and its gate electrode connected to the output terminal of the second differential amplifier; and a third output circuit connected to receive the third voltage output from the other end of the current path of the fifth transistor as its supply voltage, the third output circuit outputting the third voltage at the time when the second transistor is turned on and applying it to the back gate of the second transistor.

10. The circuit according to claim 9, wherein the second output circuit is a second inverter circuit which is supplied with the third voltage as its supply voltage and has its input terminal connected to receive a signal and its output terminal connected to the back gate of the second transistor.

11. A voltage generating circuit comprising:
a pump circuit including:
first and second transistors connected between an input terminal and an output terminal, the input terminal being applied with a first voltage; and
a first capacitor which is connected at its one end to a connection node of the first and second transistors,
the pump circuit being responsive to control signals applied to the gate electrodes of the first and second transistors and another end of the first capacitor to output from the output terminal a second voltage;
a back-gate voltage generating circuit which produces a third voltage based on a comparing result between the third voltage and the second voltage, the third voltage being less than the lower one of the first and second voltages, and being applied to at least the back gate of the second transistor;
a second capacitor having its one end connected to the gate electrode of the first transistor and its other end connected to receive a corresponding one of the control signals;
a first diode having its cathode connected to a connection node of the gate electrode of the first transistor and the second capacitor and its anode connected to receive the third voltage;
a third capacitor having its one end connected to the gate electrode of the second transistor and its other end connected to receive a corresponding one of the control signals; and
a second diode having its cathode connected to a connection node of the gate electrode of the second transistor and the third capacitor and its anode connected to receive the third voltage.

12. The circuit according to claim 11, wherein the back-gate voltage generating circuit comprises:
a differential amplifier which makes a comparison between the third voltage and the second voltage; and
a third transistor having its gate electrode connected to the output terminal of the differential amplifier and its current path connected at one end to receive the first voltage and at the other end to output the third voltage.

13. The circuit according to claim 12, further comprising a first output circuit which is supplied with the third voltage as its supply voltage and outputs the third voltage at the time the second transistor is turned on.

14. The circuit according to claim 13, further comprising a second output circuit which is supplied with the third voltage as its supply voltage, outputs the third voltage at the time the second transistor is turned on and applies the third voltage to the back gate of the first transistor.

15. The circuit according to claim 13, wherein the first output circuit is a first inverter circuit which is supplied with the third voltage as its supply voltage and has its input terminal connected to receive a signal and its output terminal connected to the back gate of the first transistor.

16. The circuit according to claim 14, wherein the second output circuit is a second inverter circuit which is supplied with the third voltage as its supply voltage and has its input terminal connected to receive a signal and its output terminal connected to the back gate of the second transistor.

17. The circuit according to claim 12, wherein the third transistor is an N-channel MOS transistor.

18. The circuit according to claim 12, wherein the third transistor is a P-channel MOS transistor.

19. The circuit according to claim 11, wherein the back-gate voltage generating circuit comprises a first differential amplifier which outputs the difference between the first voltage and the third voltage, a second differential amplifier which outputs the difference between the second voltage and the third voltage, a fourth transistor having its current path connected at one end to receive the first voltage and its gate electrode connected to the output terminal of the first differential amplifier, a fifth transistor having its current path connected at one end to another end of the current path of the fourth transistor and its gate electrode connected to the output terminal of the second differential amplifier, and a third output circuit connected to receive the third voltage output from the other end of the current path of the fifth transistor as its supply voltage, the third output circuit outputting the third voltage at the time when the second transistor is turned on and applying it to the back gate of the second transistor.

20. The circuit according to claim 19, wherein the second output circuit is a second inverter circuit which is supplied with the third voltage as its supply voltage and has its input terminal connected to receive a signal and its output terminal connected to the back gate of the second transistor.

* * * * *